(12) United States Patent
Jacobson et al.

(10) Patent No.: US 8,612,426 B2
(45) Date of Patent: Dec. 17, 2013

(54) SYSTEMS AND METHODS FOR ARRANGING PARTICIPANT INTERVIEW CLIPS FOR ETHNOGRAPHIC RESEARCH

(75) Inventors: Ben Aaron Jacobson, Madison, WI (US); Anne Keatley Schorr, Chicago, IL (US); Megan Lee Fath, Chicago, IL (US); Carolyn Patricia Stuenkel, Chicago, IL (US); Adisorn Supawatanakul, Chicago, IL (US)

(73) Assignee: Conifer Research LLC, Chicago, IL (US)

( * ) Notice: Subject to any disclaimer, the term of this patent is extended or adjusted under 35 U.S.C. 154(b) by 0 days.

(21) Appl. No.: 13/528,538

(22) Filed: Jun. 20, 2012

(65) Prior Publication Data
US 2012/0323891 A1 Dec. 20, 2012

Related U.S. Application Data

(60) Provisional application No. 61/498,890, filed on Jun. 20, 2011.

(51) Int. Cl.
*G06F 17/30* (2006.01)

(52) U.S. Cl.
USPC ............... 707/722; 707/738; 705/32

(58) Field of Classification Search
USPC ............... 707/722, 738, 736; 705/32
See application file for complete search history.

(56) References Cited

U.S. PATENT DOCUMENTS

| | | | |
|---|---|---|---|
| 7,253,817 B1 * | 8/2007 | Plantec et al. | 345/473 |
| 2002/0002482 A1 * | 1/2002 | Thomas | 705/10 |
| 2005/0246734 A1 * | 11/2005 | Kover et al. | 725/24 |
| 2005/0283378 A1 * | 12/2005 | Iserson | 705/1 |
| 2007/0233622 A1 * | 10/2007 | Willcock | 706/16 |
| 2009/0043623 A1 * | 2/2009 | Blades et al. | 705/7 |
| 2011/0010183 A1 * | 1/2011 | Manning et al. | 705/1.1 |
| 2011/0167084 A1 * | 7/2011 | Bovenschulte et al. | 707/769 |

* cited by examiner

*Primary Examiner* — Debbie Le
(74) *Attorney, Agent, or Firm* — Nixon Peabody LLP; Justin D. Swindells

(57) ABSTRACT

Systems and methods for arranging participant interview clips for conducting ethnographic research. Video clips and photographs of interviews of participants in a market research study are stored in a database. Each item stored in the database is tagged with an interpretive tag indicative of an observed behavioral, attitudinal, or emotive characteristic of the participant. A user searches the database for tags or search terms of interest, and selects clips from the search results for inclusion in a perspective, which is a collection of selected clips and their associated tags and comments from multiple users who collaborate to determine which clips to include in the perspective. The process of creating a perspective is iterative and collaborative, in which the database can be mined and re-mined using different search strategies by multiple users, who provide their comments on selected clips to form a perspective that can be used for product innovation.

23 Claims, 11 Drawing Sheets

SYSTEMS AND METHODS FOR ARRANGING PARTICIPANT INTERVIEW CLIPS FOR ETHNOGRAPHIC RESEARCH

CROSS-REFERENCE TO RELATED APPLICATION

This application claims the benefit of U.S. Provisional Patent Application Ser. No. 61/498,890, filed Jun. 20, 2011, entitled "Systems and Methods for Arranging Participant Interview Clips for Ethnographic Research," which is incorporated herein in its entirety.

TECHNICAL FIELD

Aspects of the present disclosure relate to systems and methods for arranging or managing participant interview media files, including video clips and photographs, for ethnographic research in connection with a market research study.

BACKGROUND

Market research endeavors to understand what motivates a consumer's purchasing behavior and how products or services can be modified or innovated to entice more consumers to purchase the product or service. The research involves conducting interviews with volunteers (called participants) who agree to be photographed or recorded by audio and/or video means, typically in the environment in which they use or interact with or are exposed to a product or service. These interviews are stored and organized in a database as media files. The research tends to be linear, non-collaborative, and is not well-suited to understand the emotive, behavioral, or attitudinal drivers or underpinnings behind a consumer's purchasing decision. Nor is conventional research well-suited for revealing multiple perspectives from interrogating the same data. These perspectives could span across seemingly unrelated product lines and yield surprising paradigmatic shifts in product direction or innovation, but the data is not arranged or tagged in a manner that permits these perspectives to emerge. Aspects of the present disclosure address these and other shortcomings.

SUMMARY

The present disclosure includes systems and methods (e.g., in the form of a web-based software program interface) for storing and organizing media clips for the purpose of conducting internally observation-based ethnographic research, which focuses on identifying and tagging behavioral cues relating to a participant's home environment or interaction with or impressions of a client's product. Ethnographic researchers tag the media clips stored in a database based on observed behaviors of the participants in the media clips. As a result, by identifying problems arising from the participants' behavioral cues observed by the researchers in the media clips, solutions to a client can be recommended that could lead the client to product innovations or design solutions, identify macro-level trends, set planning priorities, or the like, providing the client with a competitive edge by refining their existing products or designing new ones that would be more satisfying to the participant. The output of the software interface includes a collection of media clips called a perspective, which, for example, reveal a pattern indicative of a recurring behavior by different participants.

An aspect of the present disclosure is re-use of the media data in the database to mine the same data repeatedly but with different focuses to produce different outputs. The deeper the database grows, the more the re-use aspect is increasingly enhanced. The tags associated with the media files stored in the database are integral to the ability of users of the database to mine the data for relevant clips for inclusion in a perspective that can be used for product innovation.

Conventional market research studies involve asking the client to describe the problem. Once the problem is defined, recommendations about product modifications or innovations are provided that focus on addressing the problem described from the client's viewpoint. The approach offered by aspects of the present disclosure defines the problem from the participant's perspective by asking open-ended questions that are designed to elicit unsolicited and spontaneous information from the participant, divorced from any preconceived influences from the manufacturer. In this way, behavior-based patterns can be identified in participants' product interactions that are not ascertainable from conventional solutions. Media files (which can include video clips of participant interviews, photographs, audio files, or any combination thereof) are stored on and accessed by a media file database, and each media file is associated with one or more behavioral-based tags or themes, called "interpretive" tags. A key aspect of the present disclosure is the ability to associate "interpretive" tags with a media file that depicts a participant's environment or interaction with a product. As used herein, an "interpretive tag" is a value stored in a memory device and indicative of an observed behavioral, attitudinal, or emotive characteristic of a human participant being photographed or video-recorded under observation and/or questioning by a researcher in connection with a market research study. An interpretive tag as used herein differs from a descriptive tag used by prior art systems.

Another aspect of the present disclosure is the ability to mine the same tagged data repeatedly with different foci to produce different outputs. This functionality appreciates that humans are not one-dimensional, but rather can provide a variety of behavioral cues that are apparent only by re-targeting the data with a focus on a particular behavioral pattern. The cumulative knowledge obtained by producing multi-dimensional outputs with different behavioral foci makes the systems of the present disclosure extremely flexible, and the behavior-based tags are key to this flexibility. In fact, instead of being stymied by more tagged data, as the database grows deeper, the more versatile the system becomes.

When a user enters a search, the software interface displays tags (including interpretive tags) that are relevant to the search term and displays the number of clips associated with each related tag. Accurate tag results are key to the user's ability to identify patterns across different clips to construct a story or eventually a feature or perspective for publication to a wider audience.

According to another aspect, when a user selects a clip from the database to view, the software interface also displays icons of clips comprising the entire interview as a timeline, including the clips immediately before and after the selected clip. By mousing or hovering over any clip, related tags are displayed associated with that clip. The software interface also displays similar media clips that share the same tags as the selected media clip. The user can also add dissimilar clips to a sandbox or perspective as described in more detail below.

As the user views a media clip, the software interface can also display photos from the interview to provide context for the participant's descriptions or references not shown in the media clip being played. At every stage of the "funnel" process in which multiple users collaborate to select clips from the database to create a perspective, tags associated with displayed clips are shown, similar clips sharing at least one tag in common with any tag associated with a displayed clip, and the number of other clips in the database that share the same tag as the displayed clip can be displayed. By displaying interpretive tags with displayed clips, similar clips, and other clips sharing the same tags, users can coalesce around a subset of media files that can yield surprising perspectives about products or about a participant's attitude, behavior, or emotional feelings about a product or an environment. These perspectives can be used to brainstorm about improvements or innovations to products that might involve products that seemingly are completely unrelated to one another. The greater the variety of data stored in the database, the richer it becomes. Interviews about many different types of products can be stored in the database to reveal ethnographic patterns in the data that can lead to innovations that would not otherwise emerge from data about a single product or line of products.

The user's search history is displayed on a dashboard, allowing the user to see at-a-glance prior searches and recall them quickly in a story grid. In some aspects, items viewed or accessed are stored in a session for later retrieval. The footprints allow the user to see search strategies, which can include searches for interpretive tags in the database.

The user can also filter by tags in addition to media type, date added, and rating. By selecting a particular tag, all clips in the database that are associated with the selected tag are displayed as a story grid for selection by the user. In addition, a count frequency is indicated with each tag as a tally of the number of times the tag appears in the search results displayed in the story grid.

When a tag is selected from a list of tags displayed with a timeline of a participant interview clip selected for playback by a user, markers are highlighted along the timeline at each clip that is associated with the selected tag in the interview so that the user can see where in the displayed timeline of the interview the selected tag was marked.

According to an aspect of the present disclosure, a method of arranging media files for ethnographic research is provided. The method includes: storing in a database a plurality of electronic media files each including a digital photograph or a video clip of an interview of a human participant being photographed or video-recorded under observation or questioning by a researcher in connection with a market research study; using a controller, associating with each of at least some of the electronic media files one or more distinct interpretive tags, each of the interpretive tags being a data element stored in the database and indicative of an observed behavioral, attitudinal, or emotive characteristic of the human participant; receiving, using the controller, (a) a selection of at least a selected one of the interpretive tags or (b) a query that is run on the database including the interpretive tags; producing a search result responsive to the receiving, the search result including a subset of the electronic media files, each of at least some of the subset of electronic media files being associated with at least one of the interpretive tags or with the selected one of the interpretive tags; causing to be displayed on a display device a representation of the search result as a plurality of thumbnail images, each of the thumbnail images corresponding to a digital photograph or a video clip of corresponding ones of the subset of the electronic media files; and causing to be displayed on the display device a plurality of related tags associated with the subset of electronic media files, wherein at least one of the related tags includes an interpretive tag.

The method can further include: receiving an indication of a selection of a first selected one of the subset of the electronic media files; causing to be displayed on the display device at least some of the interpretive tags that are associated with the first selected electronic media file; and causing to be displayed on the display device a set of similar thumbnail images corresponding to a second subset of electronic media files each having at least one common interpretive tag with the first selected electronic media file, each of the thumbnail images in the set of similar thumbnail images corresponding to a video clip or a digital photograph stored in the database.

The method can further include: receiving an indication to store the first selected electronic media file in a session by a first user of a first user account; and responsive to receiving the indication to store the first selected electronic media file, storing the first selected electronic media file in the session.

The method can further include: authorizing access to the first user account prior to storing the first selected electronic media file in the session; and causing to be displayed on the display device a first username associated with the first user account.

The method can further include causing to be displayed on the display device a set of recommended thumbnail images corresponding to recommended ones of the electronic media files that each share at least one interpretive tag in common with the interpretive tag associated with the first selected electronic media file.

The method can further include: authorizing access to a second user account; receiving an indication of a selection of a second selected one of the subset of the electronic media files by a second user of the second user account; and storing the second selected electronic media file in the session.

The method can further include inviting the second user to access the session by sending an invitation to a contact identifier associated with the second user account, the invitation including a code or identifier associated with the session. The contact identifier can include an email address or a mobile telephone number.

The method can further include receiving by the second user an input that includes the code to grant access by the second user account to the session.

The method can further include receiving an indication from the second user to remove the first selected electronic media file from the session, and responsive thereto, removing the first selected electronic media from the session.

The method can further include: prompting the first user to enter a description explaining why the first selected electronic media file is being selected for inclusion in the session; and causing to be displayed on the display device the description with the thumbnail image corresponding to the first selected electronic media file and the interpretive tag associated with the first selected electronic media file.

The method can further include: prompting the second user to enter a second description explaining why the second selected electronic media file is being selected for inclusion in the session; and causing to be displayed on the display device the second description with the thumbnail image corresponding to the second selected electronic media file.

The method can further include: prompting the first user to enter a description explaining why the first selected electronic media file is being selected for inclusion in the session; and causing to be displayed on the display device the description with the thumbnail image corresponding to the first selected electronic media file such that the thumbnail image corresponding to the first selected electronic media file and the associated description and the thumbnail image corresponding to the second selected electronic media file and the associated second description are displayed in the session on the same page on the display device.

The method can further include: storing in the session a plurality of selected electronic media files including the first selected electronic media file; receiving an indication from the first user of a selection of a selected one of the selected electronic media files stored in the session; storing the selected electronic media file stored in the session in a perspective that is distinct from the session; prompting the first user to enter a description explaining why the selected electronic media file stored in the perspective is being selected for inclusion in the perspective; and causing to be displayed on the display device the description with a thumbnail image corresponding to the selected electronic media file stored in the perspective and at least one interpretive tag associated therewith. Others of the electronic media files may not be associated with any interpretative tag.

The method can further include: causing to be displayed on the display device a timeline of icons of a video-recorded interview with which the first selected electronic media file is associated, each of the icons representing a thumbnail image corresponding to a video clip of a portion of the video-recorded interview; causing to be highlighted on the display device a first of the icons corresponding to the first selected electronic media file in the timeline; receiving a selection of a second of the icons in the timeline; and causing to be displayed a second thumbnail image corresponding to a second video clip of a portion of the video-recorded interview and at least one interpretive tag associated with the second video clip. The second thumbnail image can be displayed as a popup. The receiving the selection of the second icon can include receiving an indication of mousing or hovering over the second icon to cause the popup to appear.

The associating can include storing in the database the one or more distinct interpretive tags with corresponding ones of the at least some electronic media files.

The method can further include causing to be displayed on the display device a listing of all tags associated with the electronic media files stored in the database, wherein one or more of the tags in the listing are selectable by a user input device, and wherein each media file in the subset of electronic media files in the search result is associated with the selected one or more tags.

The method can further include causing to be displayed with each of the related tags a value corresponding to the number of electronic media files in the subset of electronic media files associated with corresponding ones of the related tags.

According to another aspect of the present disclosure, a non-transitory computer-readable medium encoded with instructions to cause one or more controllers to implement a method is provided. The method can include any combination of the foregoing aspects.

According to yet another aspect of the present disclosure, a system is provided, which includes: a database storing a plurality of electronic media files each including a digital photograph or a video clip of an interview of a human participant being photographed or video-recorded under observation or questioning by a researcher in connection with a market research study; a controller configured to associate with each of at least some of the electronic media files one or more distinct interpretive tags, each of the interpretive tags being a data element stored in the database and indicative of an observed behavioral, attitudinal, or emotive characteristic of the human participant; and an interface coupled to the controller and configured to receive a selection of at least a selected one of the interpretive tags; a query parser or language engine coupled to the database and configured to receive a query that is run on the database including the interpretive tags, where the controller is configured to produce a search result that includes a subset of the electronic media files, each of at least some of the subset of electronic media files being associated with at least one of the interpretive tags or with the selected one of the interpretive tags, the interface is configured to cause to be displayed on a display device (a) a representation of the search result as a plurality of thumbnail images, each of the thumbnail images corresponding to a digital photograph or a video clip of corresponding ones of the subset of the electronic media files, and (b) a plurality of related tags associated with the subset of electronic media files, and where at least one of the related tags includes an interpretive tag.

The controller can be configured to carry out any of the foregoing aspects.

According to still another aspect of the present disclosure, a method includes: storing in a database a plurality of electronic media files each including a digital photograph or a video clip of an interview of a human participant being photographed or video-recorded under observation or questioning by a researcher in connection with a market research study; using a controller, associating with each of at least some of the electronic media files one or more distinct interpretive tags, each of the interpretive tags being a data element stored in the database and indicative of an observed behavioral, attitudinal, or emotive characteristic of the human participant; receiving, using the controller, (a) a selection of at least a selected one of the interpretive tags or (b) a query that is run on the database including the interpretive tags; producing a search result responsive to the receiving, the search result including a subset of the electronic media files, at least one electronic media file of the subset of electronic media files being associated with at least one of the interpretive tags or with the selected one of the interpretive tags; causing to be displayed on a display device a listing of at least some of the tags that are associated with the electronic media files of the subset of electronic media files; and causing to be displayed on the display device a representation of similar electronic media files each sharing at least one interpretive tag in common with the interpretive tag associated with the at least one electronic media file of the subset of electronic media files.

The method can further include causing to be displayed on the display device a value corresponding to the number of other electronic media files in the database that are associated with the same interpretive tag as the interpretive tag associated with the at least one electronic media file of the subset of electronic media files.

The method can further include causing to be displayed on the display device a selected one of the subset of electronic media files for playback and a timeline including a plurality of icons arranged in chronological order and representing media clips of an interview that includes the selected one of the subset of electronic media files for playback.

The method can further include causing to be displayed on the display device at least some of the tags associated with the selected one of the subset of electronic media files for playback, wherein at least one of the at least some of the tags associated with the selected one of the subset of electronic media files for playback is an interpretive tag.

The method can further include receiving an indication of a selection of one of the icons of the timeline, and responsive thereto, causing to be displayed on the display device a representation of an electronic media file associated with the selected icon and at least one interpretive tag associated with the electronic media file associated with the selected icon.

The selected icon can be selected by mousing or hovering over the selected icon to cause the representation and the at least one interpretive tag associated with the electronic media file associated with the selected icon to appear as a popup.

The method can further include: authorizing a first user to access a session, the session including a first subset of electronic media files and their associated tags; receiving a selection by the first user of a selected first electronic media file from the subset of electronic media files for inclusion in a storage location; storing the selected first electronic media file in the storage location; receiving a selection by the second user of a selected second electronic media file from the subset of electronic media files; storing the selected second electronic media file in the storage location; and causing to be displayed on the display device a representation of the selected first electronic media file and at least one interpretive tag associated with the selected first electronic media file and a representation of the selected second electronic media file and at least one interpretive tag associated with the selected second electronic media file.

The method can further include causing to be displayed on the display device a plurality of recommended electronic media files, wherein each of the recommended electronic media files is associated with at least one interpretive tag in common with the first selected electronic media file or the second selected electronic media file.

The method can further include receiving an indication to drag the selected first electronic media file or the selected second electronic media file and drop the selected first electronic media file or the selected second electronic media file into a different location on the page, and responsive thereto, cause the selected first or second electronic media file to be stored in a perspectives store.

The foregoing and additional aspects of the present disclosure will be apparent to those of ordinary skill in the art in view of the detailed description of various aspects, which are made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

DETAILED DESCRIPTION

Figure 1:
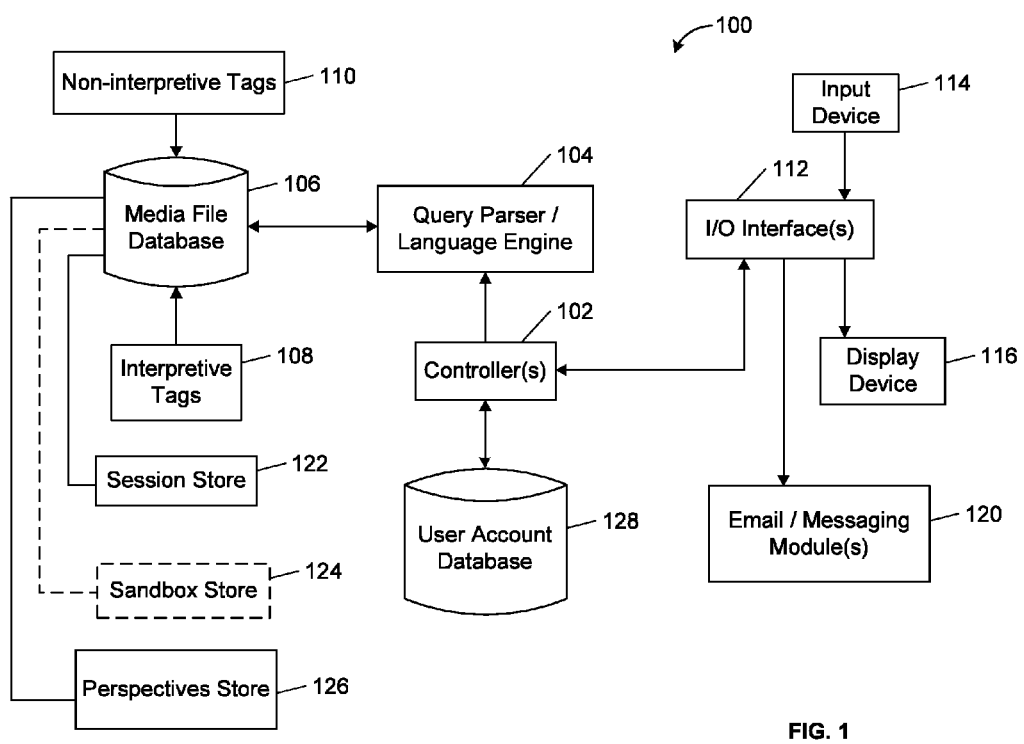
FIG. 1 is a functional block diagram of a system for arranging participant interviews to produce a perspective by multiple users of the system.

A system 100 for arranging participant interview clips, including video clips and photographs, for ethnographic research is shown as a functional block diagram in FIG. 1. The system 100 includes one or more controllers 102, which can be distributed over a network. For ease of discussion, the one or more controllers 102 will be referred to herein as the controller 102, but it is to be understood that the controller 102 can include more than one controller. The controller 102 is coupled to a query parser or language engine 104, which is coupled to a media file database 106. Interpretive tags 108 and non-interpretive tags 110 are inputted into the database and associated with various media files stored in the media file database 106. A media file, which can be a video clip of a participant interview, a photograph taken as part of a participant interview, or an audio recording of a participant interview, has at least one tag associated with it, and the tag can be an interpretive tag or a non-interpretive tag or a combination of one or more interpretive tags and one or more non-interpretive tags. A non-interpretive tag is any other type of tag that is not an interpretive tag. The term "tags" as used herein can refer generally to both interpretive and non-interpretive tags.

The controller 102 is coupled to one or more I/O interfaces 112, which receive inputs from one or more users and communicate outputs to one or more output devices. The inputs received by the I/O interface 112 can be received by one or more input devices 114, such as a computer mouse, a touchscreen, or other human-machine interface (HMI). The outputs communicated by the I/O interface 112 can include a display device 116, such as a liquid crystal display or other video display device. The display device 116 can include one or more display devices. The I/O interface 112 is also coupled to one or more email or messaging modules 120, which are configured to communicate messages by electronic mail, text messaging, or other electronic delivery arrangements.

Subsets of media files can be produced from the media files stored in the media file database 106, and stored in one or more memory locations either on the same memory device on which the media files reside or on a different memory device. A subset of each media clip viewed or accessed by a user of the system 100 can be stored in a session store 122. Selected media clips from the session store 122 can optionally be stored in a sandbox store 124 along with insights or comments or viewpoints (collectively, insights, comments, and viewpoints will be referred to generally as comments herein) describing why the media clips were selected for inclusion in the sandbox store 124. Which media files are included in the sandbox store 124 is a collaborative process in which multiple users can add or remove media files relative to the sandbox store 124 to create an emerging perspective. From the sandbox store 124, some or all of the media files stored in the sandbox store 124 can be selected for inclusion in a perspectives store 126 along with comments, insights, or viewpoints from one or more users who collaborated to determine which media files from the sandbox store 124 to include in the perspectives store 126. The stores 122, 124, 126 can be part of the database 106, such as in a partition of the database, or they can be maintained as one or more memory devices separate from and coupled to the database 106.

Aspects of the present disclosure promote and encourage collaboration among multiple users to produce a "perspective" about a product (as used herein, a product includes a service). A perspective is a collection of media files, such as video clips and/or digital photographs, which are arranged together with one or more tags including interpretive tags, commentary or observations about the selected media files in the perspective, and other input from multiple users of the system 100, to produce a "story" or a new or different perspective about a product that can lead to product modifications or innovations. A compelling perspective tells a story, which can lead to shifts in thinking about the ways consumers interact with products, what influences their purchasing behavior, or the emotional connection consumers have with their products. Integral to creating and publishing these stories or perspectives according to some aspects of the present disclosure is the interpretive tag. Another is the collaborative and iterative way in which media files are selected and commented upon by multiple users of the system 100 for inclusion in a perspective. Put another way, a perspective is a deliverable that includes a collection of media files, commentary, and tags, arranged in a manner that tells a story or advances a perspective, which can be published as an electronic report or file for further deliberations about product direction or innovation. A perspective is part of a brainstorming process from which product innovations and changes emerge.

Figure 2:
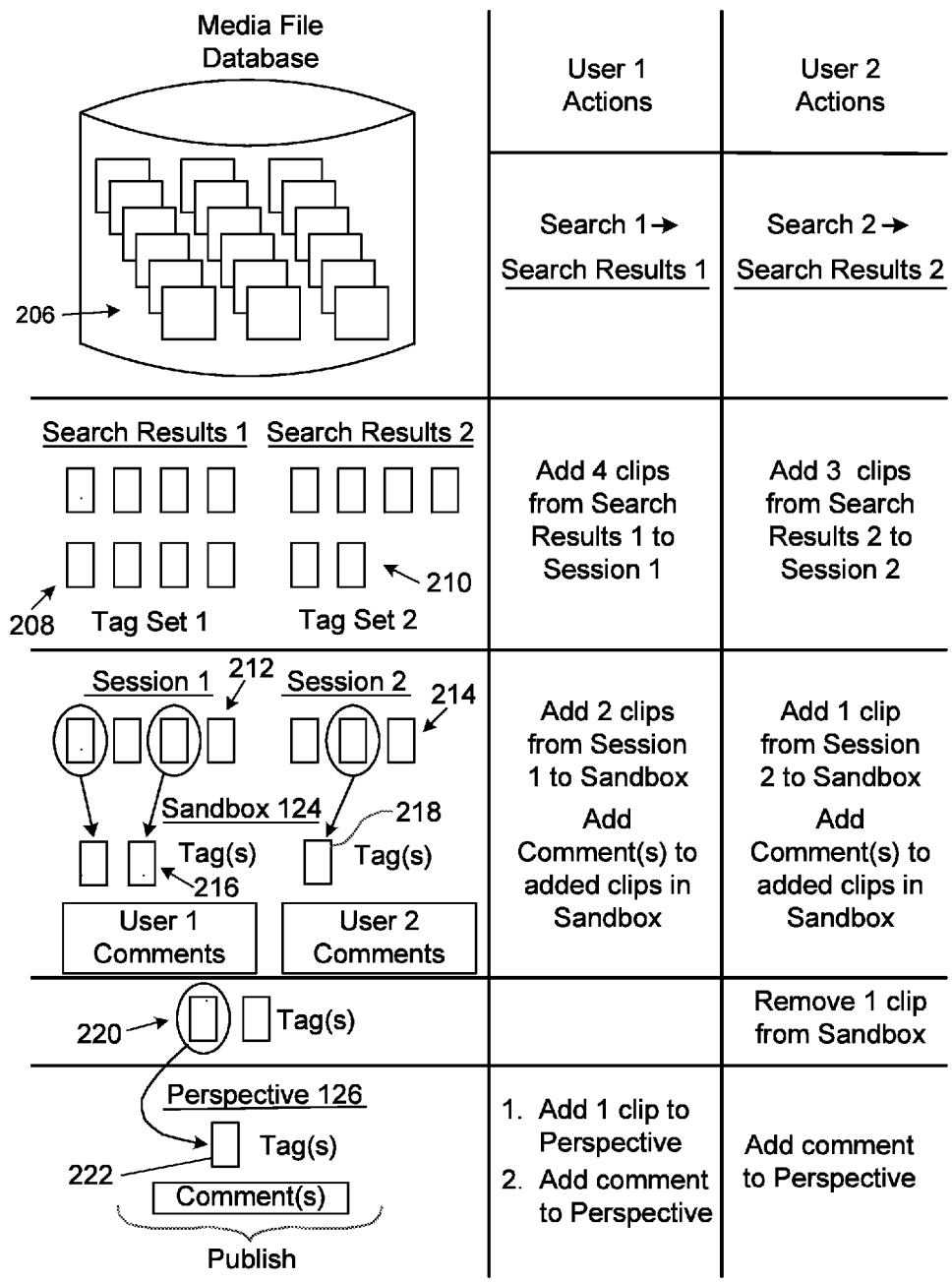
FIG. 2 is an illustration of exemplary actions that can be performed by collaboration of two users of the system shown in FIG. 1 to select a subset of media clips for inclusion in a perspective.

An example of the collaborative and iterative aspects of the present disclosure is illustrated in FIG. 2. The left-side of the figure represents the media files and the various stores 122, 124, 126 in which some or all of the media files can be stored. The right-side of the figure represents actions taken by a first user ("User 1") and a second user ("User 2") of the system 100. The sequences and actions depicted in FIG. 2 are merely exemplary to illustrate the collaborative and iterative aspects of the present disclosure. Aspects of the present disclosure encourage collaboration in that it involves multiple users to collaborate on selecting media files for inclusion in a perspective and for commenting upon why those media files should be included. Aspects of the present disclosure provide for an iterative process in which media files can be added or removed by multiple users until a final set of media files is settled upon for publication as a perspective. Tags, including interpretive tags 106, are displayed with the selected media files to reveal behavioral, emotive, or attitudinal patterns in connection with a participant's interaction with a product or environment.

Referring to FIG. 2, the media file database 106 includes many media files 206, which can include digital photographs and video or audio clips of an interview of a human participant being photographed or video-recorded under observation or questioning by a researcher in connection with a market research study. Each interview is recorded and produces multiple video clips that together form the entire interview, and digital photographs taken during the interview can be stored with the video clips in the media file database 106.

The media file database 106 can include hundreds or even thousands of media files 206, and a goal of the system 100 is to cull a few media files that can be put together in a compelling way to produce a new perspective on an existing or new product. In this example, User 1 performs a first search, which produces a first set of search results, termed "Search Results 1" in FIG. 2. The first search can by carried out by selecting one or more interpretive tags 108 or by entering a query that is run on the media file database 106 by the query parser/language engine 104. User 2 performs a second search, which produces a second set of search results, termed "Search Results 2." The use of the terms first, second, third, and so forth herein is not intended to convey any temporal sequence or rank of importance but rather to differentiate like elements from one another.

The two search results are shown diagrammatically in FIG. 2. Search Results 1 has returned eight media files 208 having an associated tag set 1, while Search Results 2 has returned six media files 210 having an associated tag set 2. The tag sets 1 and 2 can include interpretive tags. Each media file 208, 210 has associated with it one or more tags, which can be an interpretive tag 108, a non-interpretive tag 110, or a combination of both types 108, 110 of tags. User 1 selects four media files 212 and adds them to Session 1. These four media files 212 can be stored in the session store 122. User 2 selects three media files 214 and adds them to Session 2. Alternately, User 2 can add the three selected media files 214 to the same Session 1 to which User 1 added the four media files 212. Session 2 can also be stored in the session store 122 in a separate memory space from where Session 1 is stored. The sessions can act as a browsing history, keeping track of the media files 208, 210 from the search results that the users access or view on the display device 116. In an aspect, every video clip or photograph viewed by each user is stored in the session store 122 associated with that user.

The sessions help the users keep track of what they have viewed, but it is only the start of the collaborative and iterative process for selecting media files for inclusion in a perspective. In some aspects, an optional sandbox is provided, which is an intermediate storage for selected media files, their associated tags, and comments, insights, or viewpoints by the users who added the selected media files to the sandbox. In other aspects, the users can add media files directly from the session to a perspective. In FIG. 2, User 1 selects two media files 216 from Session 1 to be added to the sandbox store 124, and User 2 selects one media file 218 from Session 2 to be added to the sandbox store 124. As mentioned above, the users can each have their own sandboxes, or all users can add media files to a shared sandbox. The tags associated with the selected media files 216, 218 are stored with the files 216, 218 in the sandbox store 124 in addition to comments by User 1 and User 2 explaining why they added the selected media files 216, 218 or observations about the media files 216, 218 that can warrant further discussion or collaboration among multiple users.

Instead of adding selected clips from a session to the sandbox store 124, in another implementation, all clips from a session can be automatically stored in the sandbox store 124, and the user(s) remove selected clips from the sandbox store 124 until a subset of clips of interest remain in the sandbox store 124. Some or all of that subset of clips of interest can be added to the perspectives store 126.

Although User 1 added two media files 216 to the sandbox 124, User 2 can add or delete media files from the sandbox store 124 associated with User 1. Thus, in the example shown in FIG. 2, User 2 removes one media file from the sandbox 124 that was added by User 1, reducing the number of media files in the sandbox store 124 from three media files 216, 218 to two media files 220. Multiple users, including Users 1 and 2, can collaborate on the media files in the sandbox store 124, and decide collaboratively which file(s) to be included in the perspectives store 126. In this example, the collaborating users have decided to include one media file 222 from the sandbox 124 in the perspectives store 126. The media file 222 has one or more tags associated with the media file 222. Multiple users, including Users 1 and 2, can provide comments, insights, or viewpoints relating to a perspective that can be gained from the media file 222, the tag, which can be an interpretive tag 108, and comments supplied by the users. The process is iterative, so it can be repeated until the users collaborating on building a perspective have added their input in the form of media clips and their associated tags and comments to the perspectives store 126. Media files can be added or removed at any stage of the process shown in FIG. 2, and numerous iterations can be made until a final set of media files and associated tags and user comments are stored in the perspectives store 126 and are ready to be shared with or published to a wider or different audience.

Figure 3:
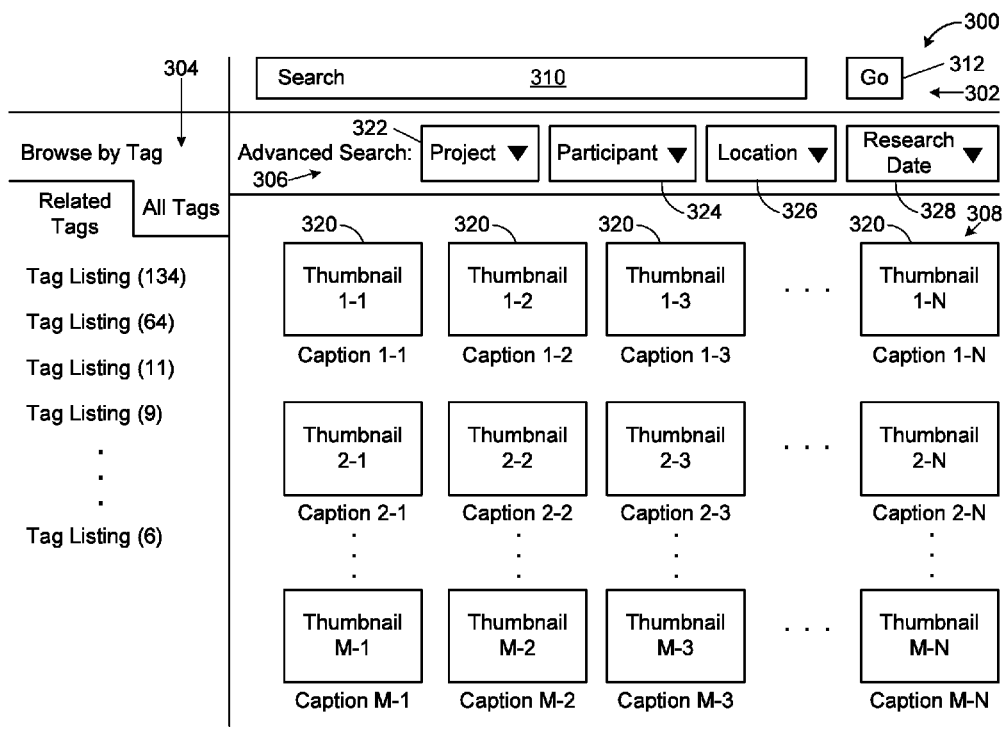
FIG. 3 is an example page of a display interface for searching the media file database shown in FIG. 1 to produce search results displayed in a story grid or array as thumbnails corresponding to the media files returned by the search along with a listing of tags associated with the search results and a count of the frequency that the tag appears in the database.

FIGS. 3-11 illustrate example screen shots of a display interface that can be displayed, for example, by the display device 116. The illustrations are not necessarily drawn to scale, and the layouts can be configured in different ways. Turning to FIG. 3, a search landing page 300 is shown having a search area 302, a tag display and selection area 304, an advanced search area 306, and a search result display area 308. The different areas can be arranged as frames or panels, for example, on a web page displayed by a web browser on a computing device. The search area 302 includes a search entry field 310 and a search button 312. A user enters a query into the search entry field 310 for searching the media file database 106, and selects the search button 312 via the input device 114, such as a mouse or a touchscreen. The query can include an interpretive tag, allowing the user to directly search for a particular interpretive tag in the search entry field 310. Alternately, the user can initiate a search by selecting a tag from the tag display and selection area 304, which includes a tab labeled "Related Tags" and a tab labeled "All Tags." By selecting the All Tags tab, a listing of all available tags in the media file database 106 is displayed, such as in alphabetical order, allowing the user to select one or more of the available tags, which can include a combination of interpretive tags 108 and non-interpretive tags 110. Each of the tags listed in the listing can be links, which when selected will search for all media files associated with the selected tag. Each of the tags can include a checkbox for selecting multiple tags to search in the database 106.

The advanced search area 306 includes pull-down or drop-down menus labeled Project 322, Participant 324, Location 326, and Research Date 328. These pull-down menus allow the user to search by project name (each market research study can be associated with a different project name), by participant name (each participant's name is displayed as a pull-down menu), by geographic location of the participant interview, or by the date or date range that the research (participant interview) was conducted, respectively. As the user selects an item from one of the menus, the search results displayed as thumbnails and associated captions in the search result display area 308 are dynamically updated in real time to reflect the media files associated with the selected item, and the tag listing in the tag display and selection area 304 is dynamically updated in real time to reflect the tags corresponding to the media files that appear in the search result display area 308.

The search results display area 308 includes an M×N (such as 5×6) array or story grid of thumbnail images, arranged in row and column format with M rows and N columns, starting with a thumbnail 1-1 in row 1, column 1, and ending with a thumbnail M-N in row M, column N. The search results from the search carried out by entering a query in the search entry field 310, selecting one or more tags under the All Tabs tag, or conducting an Advanced Search in the advanced search area 306 are displayed as the thumbnail images 320 on the search landing page 300. The number and size of the thumbnails 320 are a function of the size of the screen corresponding to the display device 116. Each thumbnail image 320 corresponds to a video clip or a photograph stored in the media file database 106 as a media file and provides a still thumbnail image representative of a frame of the video clip or of a digital photograph. Under each thumbnail 320 appears a caption that corresponds to a summary of a theme or observation about the thumbnail. Of course, the number of thumbnails is directly a function of the number of results from the search result, so fewer or more thumbnails 320 can be displayed in the search result display area 308 depending on the number of results from the requested search. If there are too many results to display on the single page 300, a link can be provided to allow the user to display additional search results in the search result display area 308.

In the tag display and selection area 304, the user can search for a specific tag by selecting the All Tags tab, which lists all of the tags associated with all of the electronic media files 206 stored in the media file database 106. In this example, the tag display and selection area 304 lists a number of Tag Listings along with a parenthetical. Each of the Tag Listings represents a distinct tag (either an interpretive tag 108 or a non-interpretive tag 110) and the parenthetical indicates the number of instances that particular tag is associated with the media files returned in the search result display area 308. A tag listing refers to the text description of a tag, and can include a link, which when selected, runs a search for media files associated with the selected tag in the database 106 for display in the search result display area 308. For example, "frustration" can be the text description of an interpretive tag, so the tag listing would display "Frustration" in the tag display and selection area 304 of the search landing page 300. If the first tag example were "frustration," there would be 134 media files in the search results represented by the thumbnails 320 that have the "frustration" tag associated with them. Similarly, 64 media files have a different tag (e.g., "distrust") associated with them, some of which can be associated with the same media files that are also associated with the "frustration" tag. For example, the first thumbnail 1-1 can correspond to a media file that is tagged with both the distrust and frustration tags. The user can search for a particular tag, such as "frustration" by entering the string "frustration" in the search entry field 310 or can select the "frustration" tag from a list of all the tags available in the database 106. The tags are listed in the tag display and selection area 304 in descending order based on the frequency with which each of the tags appear in the thumbnails 320 of the search result displayed in the search result display area 308. For example, if the user ran a query for a particular product attribute, and "frustration" was returned as the most frequently tag of the media clips in the search result, this would immediately inform the user that participants expressed frustration over the product attribute, an insight that the user can explore further by adding selected media files from the search result to the sandbox store 124. Likewise, an insight can be gained by the least frequently appearing tag. For example, suppose in the example that the tag "delight" appears only with six of the media files returned in the search result, but frustration appears the most frequently. The product attribute that was queried can now be scrutinized more closely to determine whether a frustration pattern emerges that is preventing participants from delighting in the use and enjoyment of the product. The thumbnails 320 allow the user to see at a glance related media files that can provoke new insights based on the tags listed in the tag display and selection area 304.

Examples of interpretive tags can include acceptance, thoughtfulness, distrust, delight, inspiration, pride, embarrassment, concerns, confusion, frustration, inspiration, fear, disgust, joy, satisfaction, shame, attachment, detachment, resignation, anxiety, aspiration, peaceful, calm, loyalty, relaxing, tolerance, reassurance, comfort, trust, to name a few. The interpretive tags are indicative of an observed behavioral (e.g., discomfort), attitudinal (e.g., detachment), or emotive (e.g., fear) characteristic of the human participant during the course of an interview in connection with a market research study. They are indicative of an observed reaction by the human participant, not a characteristic of the product or environment itself, but rather how the human perceives or reacts to an interaction with a product or environment. This type of research is known as ethnographic research, and the interpretive tagging relates to an ethnographic characteristic of humans. Non-interpretive tags include objective or factual characteristics about the participant (e.g., what the participant is wearing or the participant's age) or about the product (e.g., its efficacy) that is the subject of the interview. Non-interpretive tags are not ethnographic in nature, but rather are literal or objective or factual as opposed to behavioral, attitudinal, or emotional like interpretive tags. Interpretive tags, as the name suggests, require a degree of human interpretation to characterize a behavioral, attitudinal, or emotional characteristic of a human, whereas non-interpretive tags simply require accurate characterization of the characteristic or trait being described by the tag.

An integral part of the collaborative and iterative process by which a perspective is created from media files is the interpretive tag. The interpretive tag is displayed with media files of interest so that an ethnographic characteristic or pattern can emerge from the data. By ranking a frequency of the interpretive tags for each search, a behavioral, attitudinal, or emotional characteristic can emerge as a candidate for further analysis. The database 106 can be reused and mined over and over again with different search strategies and foci to reveal different perspectives, perspectives that can span across product lines or involve unique and surprising patterns that would not otherwise emerge by traditional data interrogation techniques in connection with market research studies.

Figure 4:
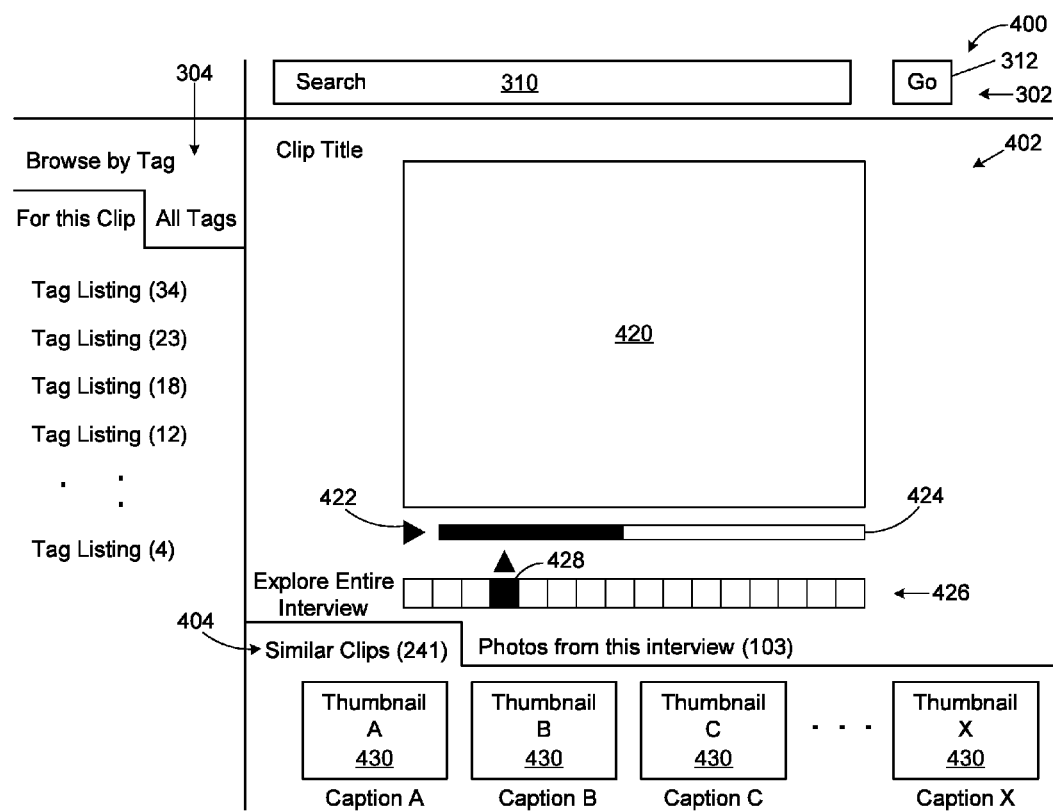
FIG. 4 is an example page that displays a clip selected from the story grid shown in FIG. 3, with playback controls and an interview timeline that allows the user to see all of the clips of the interview of which the selected clip is a part.

Turning now to FIG. 4, like reference numbers refer to like features, even though they may appear on a different page or display interface. In FIG. 4, a clip viewer page 400 includes the search entry 302 and the tag display and selection area 304. In addition, the clip viewer page 400 includes a clip view area 402 and a similar clips area 404, again arranged as different frames or panels, for example, on a web page. In this example, the user has selected one of the thumbnails 320 in FIG. 3 returned in a search result for playback. The media file corresponding to the selected thumbnail 320 is displayed in the clip playback area 420. Playback controls 422 allow the user to play or pause the clip being played in the clip playback area 420. In some aspects, the playback controls 422 can appear only when the user hovers over the clip playback area 420, such as with a mouse or a finger. A clip progress bar 424 indicates the progress of the playback from the start to the end of the selected clip. Below the clip playback area 420, the entire interview is represented as a timeline 426 of small icons corresponding to each of the clips that form the entire interview, and the selected clip 428 is highlighted to show the user where in the interview the selected clip among all the clips comprising the interview occurs. Each icon in the timeline 426 links to other portions of the interview, and when selected, the corresponding video clip appears in the clip playback area 420. In the similar clips area 404, thumbnails 430 corresponding to related media files are shown along with captions describing or summarizing each thumbnail 430. In this area 404, each media clip represented by the thumbnail corresponds to a media file that shares at least one tag in common with any tag associated with the selected clip being displayed in the clip playback area 420. Thus, the media file associated with the clip playback area 420 shares at least one tag (which can be an interpretive tag) in common with each of the media files associated with the thumbnails 430 shown in the similar clips area 404. In the tag display and selection area 304, the tags for the selected clip shown in the clip playback area 420 are displayed along with the frequency with which the tag appears in connection with other media files in the media file database 106. For example, if the media file corresponding to the clip being shown in the clip playback area 420 is associated with a tag labeled "disconnection," there are 34 other media files in the database 106 that are also tagged with the same "disconnection" tag, allowing the user to explore those other media files. Likewise, photographs from the interview can also be selected in the similar clips area 404.

Figure 5:
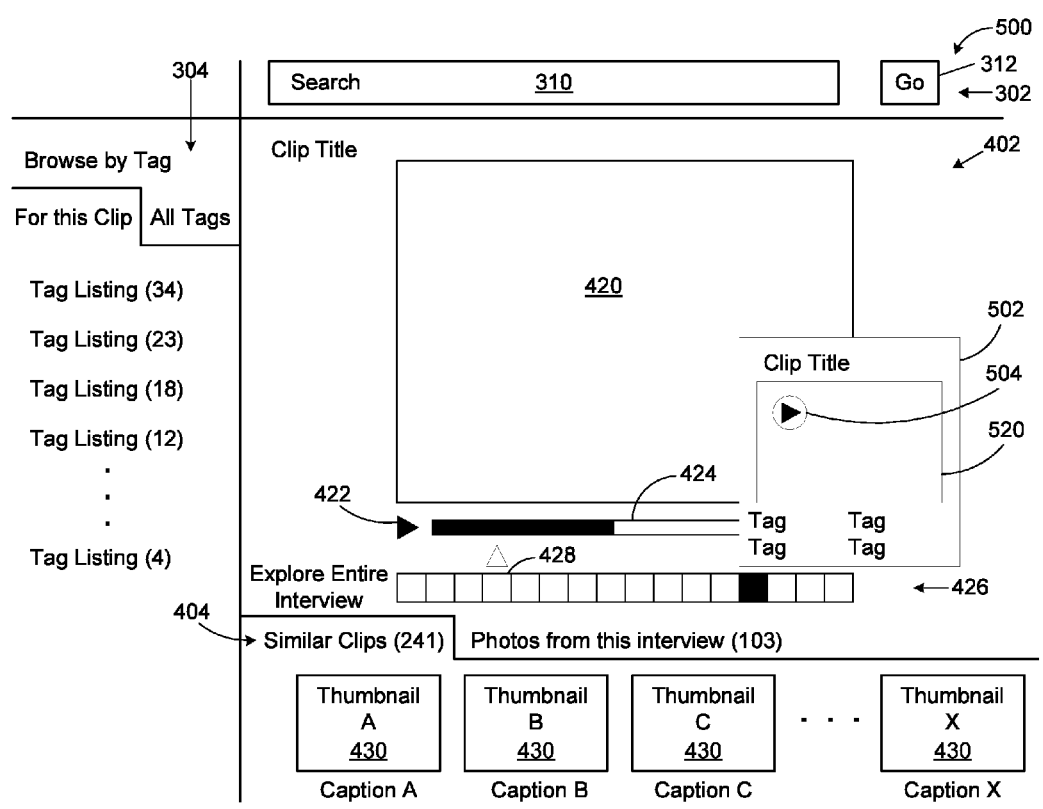
FIG. 5 is an example page that displays a popup that displays a thumbnail of a clip in the timeline shown in FIG. 4 along with its associated tags.

In the interview exploration page 500 shown in FIG. 5, when the user hovers over an icon in the timeline 426, a popup 502 appears with a thumbnail 520 of the selected clip along with the tags associated with the selected clip. A play control 504 allows the user to play the clip directly from the popup 502. Importantly, the tags associated with the clip are displayed in the popup 502, which can include interpretive tags. This allows the user to quickly browse the entire interview while scanning the tags associated with each clip in the interview. An interview comprises multiple video clips that together form the entire interview. The interview can also include photographs, which are accessed in the similar clips area 404. Like the video clips, photographs from an interview can also be tagged with interpretive and/or non-interpretive tags.

It is important to note that tags appear in multiple places on the page 500. The tags featured in the clip shown in the playback area 420 are listed in the tag display and selection area 304, and the tags associated with a clip of the interview are displayed in the popup 502, allowing the user to see at-a-glance the tags associated with both clips. Tags are a key to guiding the user to select media files for inclusion in a store that can be further analyzed and commented upon in collaboration with other users. Not only are tags associated with a particular clip (as used herein, for ease of discussion, a "clip" can refer to a video clip or a photograph) displayed, but the system 100 also displays tags associated with similar clips or other clips that share the same tag as the selected clip. The display of tags from different or related or similar clips on the same page greatly aid the user in selecting media files for inclusion in a store, such as the perspectives store 126, and can guide the user to other clips in the database 106 as the user constructs a perspective.

Figure 6:
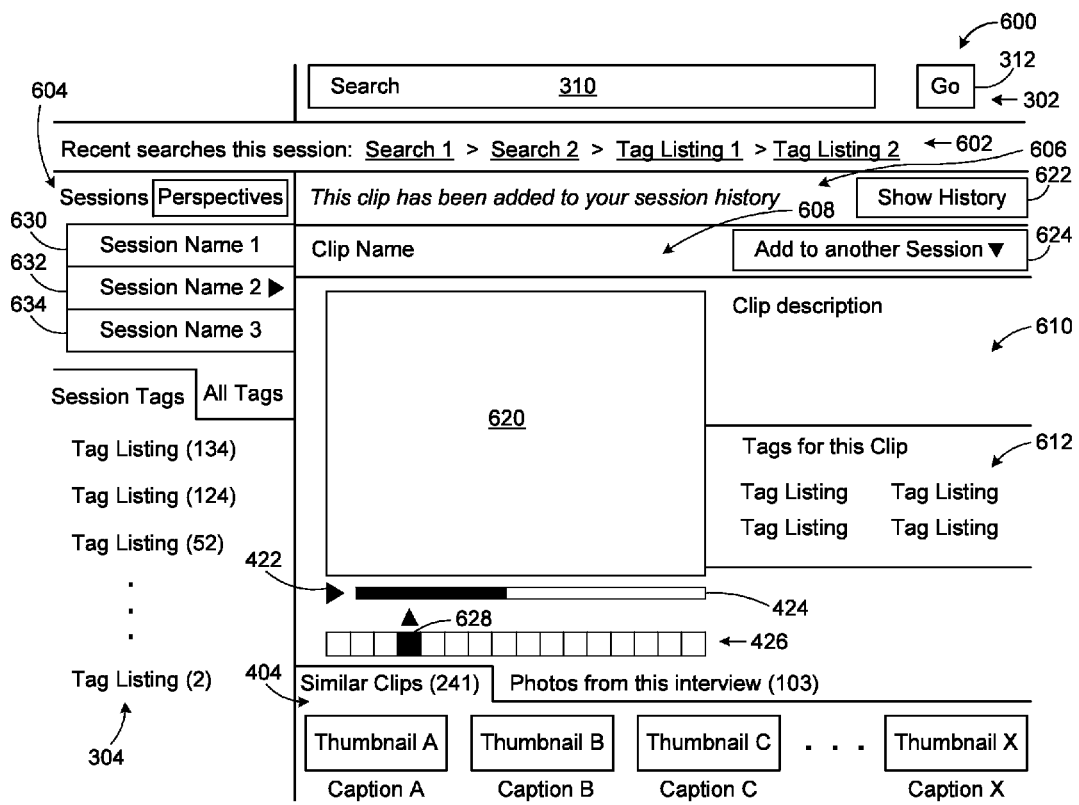
FIG. 6 is an example page that displays a clip stored in a session and tags associated with the selected clip as well as tags associated with all clips in the session.

In FIG. 6, an example session manager page 600 is shown, which conveys how the user's browsing history can be saved in the session store 122 to allow the user to explore the clips without worrying about losing track of clips the user has previously accessed. Whenever the user clicks on or accesses a clip (including a photograph), the media file and its associated tags corresponding to the clip is stored in the session store 122. A search history area 602 shows the recent searches in the session, which can include queries (e.g., Search 1, Search 2) or tag selections (e.g., Tag Listing 1, Tag Listing 2), allowing the user to readily retrieve a previously requested search. In some aspects, the searches are listed in chronological order from left to right. A session history area 606 informs the user that the clip selected for playback in the clip playback area 620 and accessed during the session has been added to the session history, meaning that the media file (or a link or pointer thereto) corresponding to the clip 620 has been stored in the session store 122. A button labeled Show History 622 can be selected by the user to show the history of clips accessed and searches requested during the selected session. A sessions and perspectives selection area 604 allows the user to select one of multiple sessions 630, 632, 634 or perspectives (described in connection with FIG. 10) to retrieve the clips (along with their associated tags) accessed and searches requested during that session or perspective. A clip description area 610 displays a description of the clip 620 being played in the clip playback area 620. A tag listing area 612 lists the tags associated with the clip 620 displayed in the clip playback area 620. An icon 628 is highlighted to show where temporally in the timeline 426 of the interview the selected clip 620 appears. The tags displayed in the tag display and selection area correspond to a selected number (e.g., top 30) or all of the tags associated with the clips in the session along with the frequency with which the particular tag appears in the database 106 (in parentheses).

A dropdown menu 624 labeled "Add to another Session" allows the user to add the clip 620 to a different session. In this example, this clip has been added to a session named Session Name 2 632 but the dropdown menu 624 allows the user to move the clip to Session Name 1 630 or Session Name 3 634. On this page 600, the tags 612 associated with the clip 620 are displayed in the clip description area 610 and the tags associated with all of the clips stored in the session store corresponding to Session Name 2 632 are also displayed in the tag display and selection area 304 along with a parenthetical indicating the frequency that each tag appears in the search results for the most recent search conducted in the session. This allows the user to compare the tags 612 associated with the clip 620 with the tags associated with all of the clips returned by the searches requested in the session. The sessions listed in the sessions and perspectives selection area 604 are sessions created by the user accessing the page 600 as well as sessions that the user is authorized to access (regardless of whether the user created the session). Each time the user logs into the system 100 following authentication in connection with the user account database 128, a new session can be created in some implementations. The active session 632 is highlighted, in this example, by an arrow or other suitable indicium.

Figure 7:
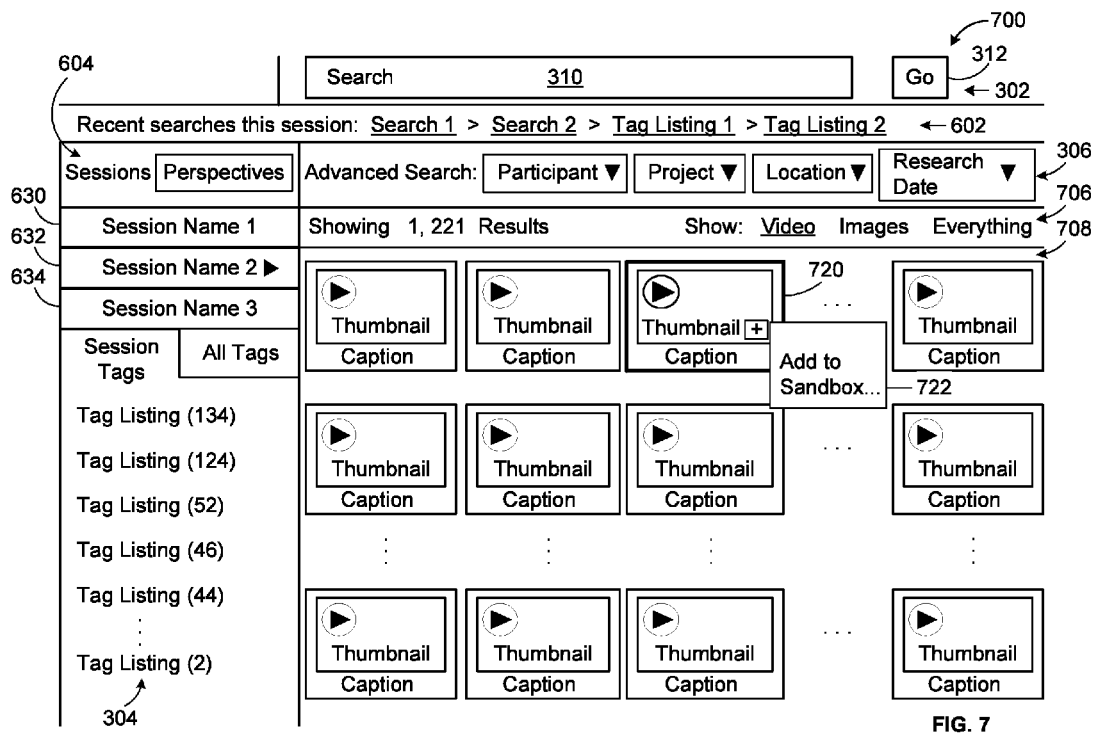
FIG. 7 is an example page of a session manager that allows the user to add selected clips in the session to a sandbox.

FIG. 7 illustrates a session management page 700 in which the user adds a media file corresponding to a thumbnail 720 stored in the session store associated with Session Name 2 632 to an optional sandbox store 124. As emphasized above, the sandbox store 124 is optional and the user can instead add clips directly from a session store 122 to the perspectives store 126. A search summary area 706 is shown along with a search result display 708 with thumbnails 720 arranged in an array or story grid corresponding to the media files returned in the most recent search shown in the search history area 602. Links allowing the user to switch the search result view from video clips to photographs or to both video clips and photographs. The media files corresponding to the search results are shown as thumbnails 720. In this example, the user has selected one of the thumbnails 720 for inclusion in the sandbox store 122 corresponding to the current session called Session Name 2 632. A control, such as shown as a plus sign, is selected by the user to produce a popup 722 that allows the user to add the media file corresponding to the thumbnail 720 to the sandbox store 124. The popup 722 can also prompt the user to enter a description explaining why the selected media file is being added to the sandbox store 124.

Figure 8:
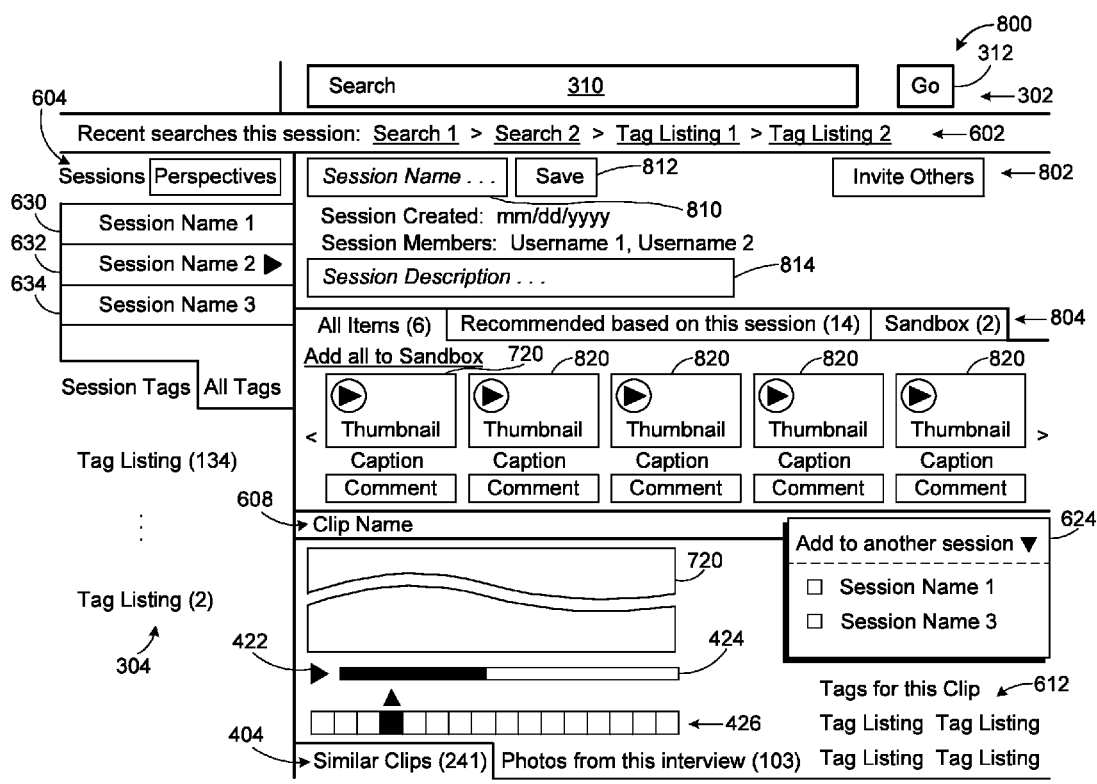
FIG. 8 is an example page of the session manager shown in FIG. 7 that shows thumbnails of clips stored in the session, recommended clips that share at least one tag in common with the clips corresponding to the thumbnails, and clips stored in the sandbox.

FIG. 8 illustrates another session management page 800 in which the user can name and provide a description for the session, invite other users to share or comment upon media clips in the session, and access media files stored in the sandbox store 124. The session management page 800 includes a session editing area 802 and a thumbnail viewer area 804. In the session editing area 802, controls are displayed that allow the user to name the session by entering a session name in a session name entry field 810, to save the session name by selecting a save button 812, enter a description for the session in a session description entry field 814, or invite other users to access the session corresponding to Session Name 2 632 by selecting via the input device 114 an Invite Others button control 802. Invitations to other users of the system 100 can be sent by email or text message using the email or messaging module 120. The system 100 can automatically generate a unique passcode that is sent with the email that the recipient users enters to gain access to the session. The user account database 128 stores authentication information about each user account that can access the database 106. In the thumbnail viewer area 804, tabs are displayed that allow the user to view all items in the session, clips recommended based on the current session, or items stored in the sandbox. In this example, six items (e.g., video clips and/or photographs) are stored in the session store 124 corresponding to the session named Session Name 2 632, and there are 14 further clips that are recommended based on this session. These recommended clips can share at least one tag in common tag with any or all media files stored in the session 632. In the thumbnail viewer area 804, the thumbnail 720 shown in FIG. 7 is shown as the newest clip added to the session 632. Other thumbnails 820 corresponding to media files previously added to the session 632 are also displayed in the thumbnail viewer area 804. In other implementations, the most recently added media clips to the session can appear in chronological order with the newest clip being added to the right of the most recently added clip in the thumbnail viewer area 804.

Figure 9:
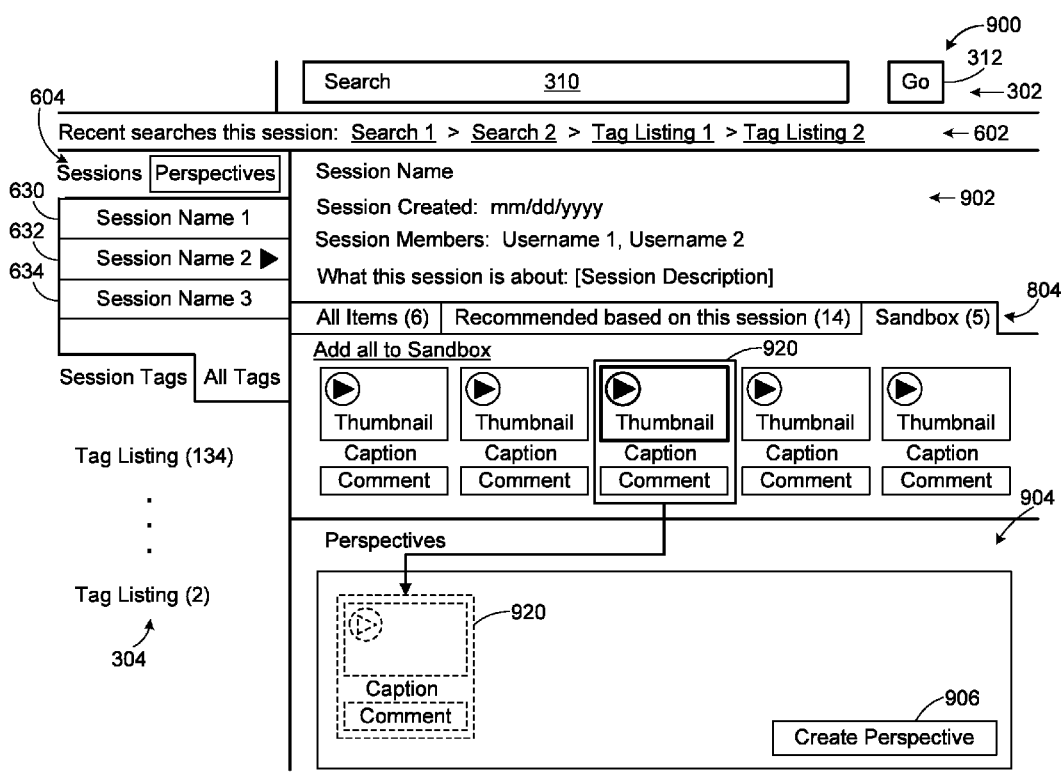
FIG. 9 is an example page that displays a user dragging and dropping a selected clip from the sandbox to a perspectives store.

In FIG. 9, a sandbox management page 900 is shown, which allows a user to add a media file from the sandbox store 124 associated with a session to a perspectives store 126. The sandbox management page 900 includes a session description area 902 that displays the name of the session (e.g., Session Name 2), the date the session was created, the members of the session (e.g., two users named Username 1 and Username 2), and a description of the session. The thumbnail viewer area 804 shows that five media clips have been added to the sandbox store 124, and the user has selected a thumbnail 920 corresponding to one of the media files stored in the sandbox store 124 for inclusion in the perspectives store 126. In this example, the user can use the input device 114 (e.g., a mouse or touchscreen) to drag and drop the thumbnail 920 from the thumbnail viewer area 804 to a perspectives area 904 on the page 900. Once dragged, the media file corresponding to the thumbnail 920 is stored in the perspectives store 126. A button control 906 labeled Create Perspective allows the user to create a new perspective, which is described in more detail in connection with FIG. 10.

Figure 10:
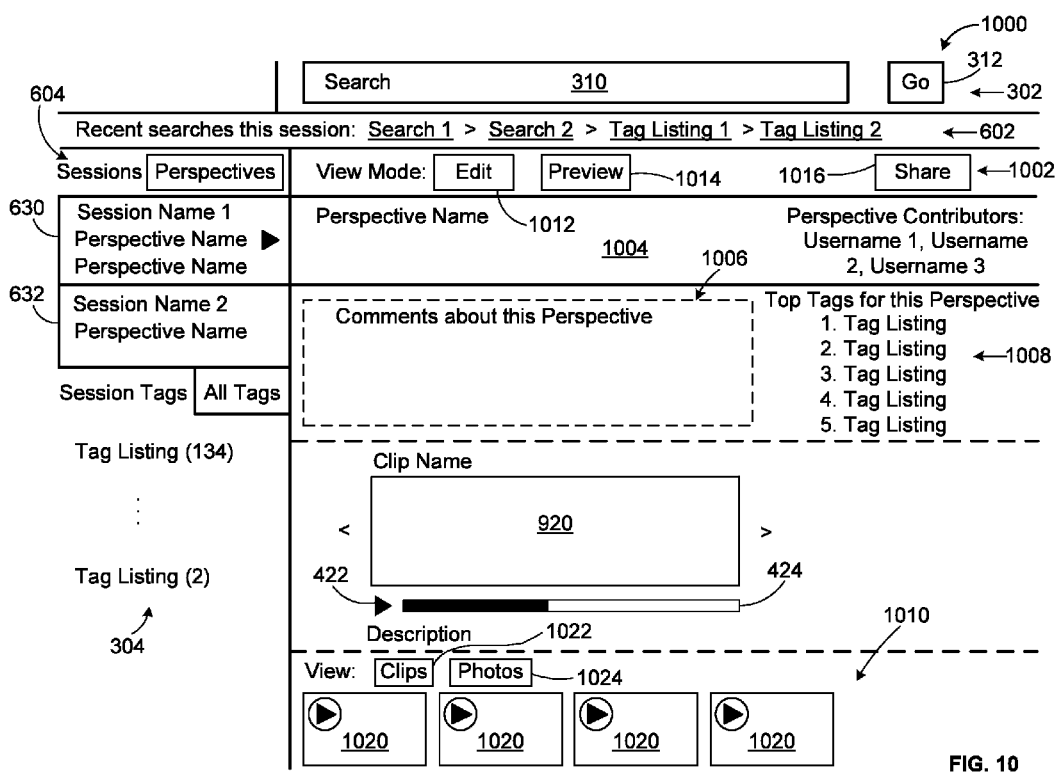
FIG. 10 is an example perspectives manager page that allows the user to add comments about a perspective and displays a listing of tags associated with clips in the perspective as well as tags associated with clips stored in the session, and thumbnails of the clips (including photographs) that are stored in the perspective.

FIG. 10 illustrates a perspectives management page 1000, which allows one or more users who have access to the perspective to manage the media files in the perspective. The perspectives management page 1000 includes a view mode area 1002, a perspective description area 1004, a perspectives comments entry field 1006, a perspectives tag listing area 1008, and a thumbnail viewer area 1010. In the view mode area 1002, the user can toggle a view mode of the perspectives by selecting an edit control 1012 or a preview control 1014. A share control 1016 allows the current user to share the perspective with one or more other users. The system 100 sends an email message or text message to the specified recipients, and the message can include comments provided in the perspectives comments entry field 1006, and at least one media file stored in the perspective along with a tag listing of some or all tags associated with the selected media file. The message can further include a unique passcode that the recipient uses to gain access to the perspective being shared. Users who access the perspective can add their comments about the perspective in the perspective comments entry field 1006, allowing multiple users to collaborate and provide input on the media files selected for the perspective. More than one perspective can be associated with a session, such as shown in the sessions and perspectives selection area 604. In this example, the session named Session Name 1 630 has two different perspectives associated with it. Each of these two perspectives can be stored in separate memory areas in the perspectives store 126. The top five tags (by frequency of appearance in the database 106) for the perspective are listed in the perspectives tag listing area 1008. In the thumbnail viewer area 1010, the user can view other clips or photos that are stored with the selected perspective in the perspectives store 126 by selecting a clips control 1022 or a photos control 1024.

In the perspective description area 1004, a name of the perspective ("Perspective Name") is displayed along with the usernames of the contributors to the displayed perspective. In this example, three contributors corresponding to Username 1, Username 2, and Username 3 are displayed in the perspective description area 1004.

Figure 11:
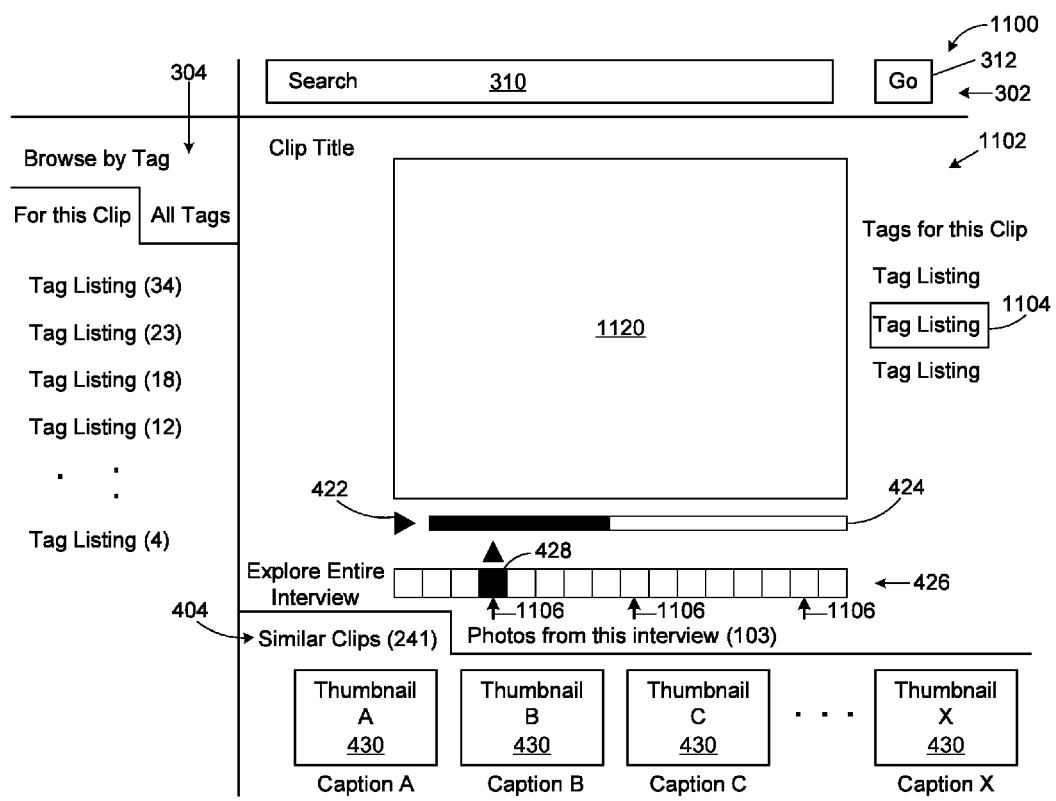
FIG. 11 is an example page that displays markers where a selected tag for a clip appears in a timeline of an interview.

FIG. 11 illustrates an example tag marker page 1100 that includes a clip viewer area 1102 and a tag listing area 110. In the clip viewer area 1102, a clip (selected from a search result, a session, a sandbox, or a perspective) has been selected for playback in a playback area 1120 of the clip viewer area 1102. The user has selected one of the tags 1104 in the tag listing (such as by hovering over or clicking the tag 1104), and markers 1106 are displayed along the timeline 426 of the interview next to each clip (represented as icons 428) that is associated with the selected tag. This allows the user to quickly go to a different clip associated with the same tag, such as an interpretive tag, as the selected clip appearing in the playback area 1120.

The example pages displayed in FIGS. 3-11 can be pages displayed by a web browser under the control of the controller 102. The web browser can access the database 106 through an intranet or private local area network, for example, or over the Internet through a firewall. Underlined elements can be clicked on by a mouse or selected by the user by touching a location corresponding to the link on a touchscreen. Boxes can represent button controls that can be selected by a mouse or touchscreen input device. Popups can be popup windows or frames displayed on the page. The layout of the frames or areas is merely exemplary, and other layouts are contemplated. A key aspect is the display of tags and related tags with the clips displayed on the page, which facilitate the process by which clips are selected for inclusion in a perspective.

FIGS. 1-11, described by way of example above, represent one or more algorithms that correspond to at least some instructions executed by the one or more controllers 102 to perform the above described functions, acts, or steps. Any of the methods or algorithms or functions described herein can include non-transitory machine or computer-readable instructions for execution by: (a) a processor, (b) a controller 120, and/or (c) any other suitable processing device. Any algorithm, software, or method disclosed herein can be embodied as a computer program product having one or more non-transitory tangible medium or media, such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.).

While particular aspects and implementations of the present disclosure have been illustrated and described, it is to be understood that the present disclosure is not limited to the precise construction and compositions disclosed herein and that various modifications, changes, and variations are not only contemplated but also apparent from the foregoing descriptions without departing from the scope of the present disclosure as defined in the appended claims.

What is claimed is:

1. A method of arranging media files for ethnographic research, comprising:
    storing in a database a plurality of electronic media files each including a digital photograph or a video clip of an interview of a human participant being photographed or video-recorded under observation or questioning by a researcher in connection with a market research study;
    using a controller, associating with each of at least some of the electronic media files one or more distinct interpretive tags, each of the interpretive tags being a data element stored in the database and indicative of an observed behavioral, attitudinal, or emotive characteristic of the human participant;
    receiving, using the controller, (a) a selection of at least a selected one of the interpretive tags or (b) a query that is run on the database including the interpretive tags;
    producing a search result responsive to the receiving, the search result including a subset of the electronic media files, each of at least some of the subset of electronic media files being associated with at least one of the interpretive tags or with the selected one of the interpretive tags;
    causing to be displayed on a display device a representation of the search result as a plurality of thumbnail images, each of the thumbnail images corresponding to a digital photograph or a video clip of corresponding ones of the subset of the electronic media files; and
    causing to be displayed on the display device a plurality of related tags associated with the subset of electronic media files, wherein at least one of the related tags includes an interpretive tag.

2. The method of claim 1, further comprising:
    receiving an indication of a selection of a first selected one of the subset of the electronic media files;
    causing to be displayed on the display device at least some of the interpretive tags that are associated with the first selected electronic media file; and
    causing to be displayed on the display device a set of similar thumbnail images corresponding to a second subset of electronic media files each having at least one common interpretive tag with the first selected electronic media file, each of the thumbnail images in the set of similar thumbnail images corresponding to a video clip or a digital photograph stored in the database.

3. The method of claim 2, further comprising:
receiving an indication to store the first selected electronic media file in a session by a first user of a first user account; and
responsive to receiving the indication to store the first selected electronic media file, storing the first selected electronic media file in the session.

4. The method of claim 3, further comprising:
authorizing access to the first user account prior to storing the first selected electronic media file in the session; and
causing to be displayed on the display device a first user-name associated with the first user account.

5. The method of claim 3, further comprising causing to be displayed on the display device a set of recommended thumbnail images corresponding to recommended ones of the electronic media files that each share at least one interpretive tag in common with the interpretive tag associated with the first selected electronic media file.

6. The method of claim 4, further comprising:
authorizing access to a second user account;
receiving an indication of a selection of a second selected one of the subset of the electronic media files by a second user of the second user account; and
storing the second selected electronic media file in the session.

7. The method of claim 6, further comprising inviting the second user to access the session by sending an invitation to a contact identifier associated with the second user account, the invitation including a code or identifier associated with the session.

8. The method of claim 7, wherein the contact identifier includes an email address or a mobile telephone number.

9. The method of claim 7, further comprising receiving by the second user an input that includes the code to grant access by the second user account to the session.

10. The method of claim 6, further comprising receiving an indication from the second user to remove the first selected electronic media file from the session, and responsive thereto, removing the first selected electronic media from the session.

11. The method of claim 3, further comprising:
prompting the first user to enter a description explaining why the first selected electronic media file is being selected for inclusion in the session; and
causing to be displayed on the display device the description with the thumbnail image corresponding to the first selected electronic media file and the interpretive tag associated with the first selected electronic media file.

12. The method of claim 6, further comprising:
prompting the second user to enter a second description explaining why the second selected electronic media file is being selected for inclusion in the session; and
causing to be displayed on the display device the second description with the thumbnail image corresponding to the second selected electronic media file.

13. The method of claim 12, further comprising:
prompting the first user to enter a description explaining why the first selected electronic media file is being selected for inclusion in the session; and
causing to be displayed on the display device the description with the thumbnail image corresponding to the first selected electronic media file such that the thumbnail image corresponding to the first selected electronic media file and the associated description and the thumbnail image corresponding to the second selected electronic media file and the associated second description are displayed in the session on the same page on the display device.

14. The method of claim 11, further comprising:
storing in the session a plurality of selected electronic media files including the first selected electronic media file;
receiving an indication from the first user of a selection of a selected one of the selected electronic media files stored in the session;
storing the selected electronic media file stored in the session in a perspective that is distinct from the session;
prompting the first user to enter a description explaining why the selected electronic media file stored in the perspective is being selected for inclusion in the perspective; and
causing to be displayed on the display device the description with a thumbnail image corresponding to the selected electronic media file stored in the perspective and at least one interpretive tag associated therewith.

15. The method of claim 1, wherein others of the electronic media files are not associated with any interpretative tag.

16. The method of claim 2, further comprising:
causing to be displayed on the display device a timeline of icons of a video-recorded interview with which the first selected electronic media file is associated, each of the icons representing a thumbnail image corresponding to a video clip of a portion of the video-recorded interview;
causing to be highlighted on the display device a first of the icons corresponding to the first selected electronic media file in the timeline;
receiving a selection of a second of the icons in the timeline; and
causing to be displayed a second thumbnail image corresponding to a second video clip of a portion of the video-recorded interview and at least one interpretive tag associated with the second video clip.

17. The method of claim 16, wherein the second thumbnail image is displayed as a popup.

18. The method of claim 17, wherein the receiving the selection of the second icon includes receiving an indication of mousing or hovering over the second icon to cause the popup to appear.

19. The method of claim 1, wherein the associating includes storing in the database the one or more distinct interpretive tags with corresponding ones of the at least some electronic media files.

20. The method of claim 1, further comprising causing to be displayed on the display device a listing of all tags associated with the electronic media files stored in the database, wherein one or more of the tags in the listing are selectable by a user input device, and wherein each media file in the subset of electronic media files in the search result is associated with the selected one or more tags.

21. The method of claim 1, further comprising causing to be displayed with each of the related tags a value corresponding to the number of electronic media files in the subset of electronic media files associated with corresponding ones of the related tags.

22. A non-transitory computer-readable medium encoded with instructions to cause one or more controllers to implement a method, the method comprising:
storing in a database a plurality of electronic media files each including a digital photograph or a video clip of an interview of a human participant being photographed or video-recorded under observation or questioning by a researcher in connection with a market research study;

using a controller, associating with each of at least some of the electronic media files one or more distinct interpretive tags, each of the interpretive tags being a data element stored in the database and indicative of an observed behavioral, attitudinal, or emotive characteristic of the human participant;

receiving, using the controller, (a) a selection of at least a selected one of the interpretive tags or (b) a query that is run on the database including the interpretive tags;

producing a search result responsive to the receiving, the search result including a subset of the electronic media files, each of at least some of the subset of electronic media files being associated with at least one of the interpretive tags or with the selected one of the interpretive tags;

causing to be displayed on a display device a representation of the search result as a plurality of thumbnail images, each of the thumbnail images corresponding to a digital photograph or a video clip of corresponding ones of the subset of the electronic media files; and causing to be displayed on the display device a plurality of related tags associated with the subset of electronic media files, wherein at least one of the related tags includes an interpretive tag.

23. A system, comprising:

a database storing a plurality of electronic media files each including a digital photograph or a video clip of an interview of a human participant being photographed or video-recorded under observation or questioning by a researcher in connection with a market research study;

a controller configured to associate with each of at least some of the electronic media files one or more distinct interpretive tags, each of the interpretive tags being a data element stored in the database and indicative of an observed behavioral, attitudinal, or emotive characteristic of the human participant; and an interface coupled to the controller and configured to receive a selection of at least a selected one of the interpretive tags;

a query parser or language engine coupled to the database and configured to receive a query that is run on the database including the interpretive tags, wherein the controller is configured to produce a search result that includes a subset of the electronic media files, each of at least some of the subset of electronic media files being associated with at least one of the interpretive tags or with the selected one of the interpretive tags, the interface is configured to cause to be displayed on a display device (a) a representation of the search result as a plurality of thumbnail images, each of the thumbnail images corresponding to a digital photograph or a video clip of corresponding ones of the subset of the electronic media files, and (b) a plurality of related tags associated with the subset of electronic media files, and wherein at least one of the related tags includes an interpretive tag.

* * * * *